(12) United States Patent
Boillot et al.

(10) Patent No.: US 10,107,913 B2
(45) Date of Patent: Oct. 23, 2018

(54) RANGE FINDER DEVICE FOR MONITORING ROBOT PROCESSING TOOL POSITION

(71) Applicant: SERVO-ROBOT, INC., Saint-Bruno (CA)

(72) Inventors: Jean-Paul Boillot, Saint-Bruno (CA); Jacques-André Gaboury, Saint Bruno (CA); Andrei Rusnac, Longueuil (CA)

(73) Assignee: Servo-Robot, Inc., Saint Bruno, Quebec (CA)

( * ) Notice: Subject to any disclaimer, the term of this patent is extended or adjusted under 35 U.S.C. 154(b) by 283 days.

(21) Appl. No.: 15/018,015

(22) Filed: Feb. 8, 2016

(65) Prior Publication Data
US 2017/0227644 A1    Aug. 10, 2017

(51) Int. Cl.
*G01C 3/08* (2006.01)
*G01S 17/48* (2006.01)
*G05B 19/401* (2006.01)
*B23K 9/127* (2006.01)
*B23K 26/03* (2006.01)

(52) U.S. Cl.
CPC .......... *G01S 17/48* (2013.01); *G05B 19/4015* (2013.01); *B23K 9/1274* (2013.01); *B23K 26/032* (2013.01); *G05B 2219/37281* (2013.01)

(58) Field of Classification Search
CPC .............. G01S 17/48; G05B 19/4015; G05B 2219/37281; B23K 9/1274; B23K 26/032
USPC ....................................................... 356/3.01
See application file for complete search history.

(56) References Cited

U.S. PATENT DOCUMENTS

| 4,581,518 | A | | 4/1986 | Takahashi et al. |
| 5,329,092 | A | | 7/1994 | Weaver et al. |
| 6,046,431 | A | * | 4/2000 | Beattie ................. B23K 9/1274 |
| | | | | 219/124.34 |
| 6,346,751 | B1 | | 2/2002 | Delfino et al. |
| 6,730,926 | B2 | | 5/2004 | Boillot et al. |
| 7,400,414 | B2 | | 7/2008 | Tobiason et al. |
| 7,912,673 | B2 | | 3/2011 | Hebert et al. |

(Continued)

FOREIGN PATENT DOCUMENTS

KR    1020090048669    3/2009

OTHER PUBLICATIONS

Berthiaume et al., "Applying new technology to visual weld inspection", AWS, 2001.

(Continued)

*Primary Examiner* — Mark Hellner

(57) ABSTRACT

A range finder device for monitoring a 3D position of a robot processing tool relative to a tracking device mounted adjacent to the robot processing tool is disclosed. A body attachable to the tracking device supports a laser unit and a camera unit. The laser unit projects a triangulation laser mark on a target area of the processing tool. The mark, a tool center point and a processing area are in a field of view of the camera unit. A control unit controls operation of the laser unit and has an image analyzer circuit for receiving an image signal produced by the camera unit, producing triangulation laser measurement data from the triangulation laser mark in the image signal, generating a signal indicative of the position of the robot processing tool as function of the triangulation laser measurement data, and transmitting the image signal produced by the camera unit.

18 Claims, 7 Drawing Sheets

(56) References Cited

U.S. PATENT DOCUMENTS

2015/0273604 A1* 10/2015 Anderson ............ B23K 1/0056
228/102
2016/0193681 A1* 7/2016 Pesme .................. B23K 9/0956
219/130.01
2016/0311056 A1* 10/2016 Schwarz ................ B23K 26/03

OTHER PUBLICATIONS

Ludwig et al., "Portable weld inspection system", CNST 2005-323 Final Report, Feb. 2007.
Noruk et al. "Laser Tool Offers Alternative for Precise Visual Weld Inspection", Inspection Trends, Oct. 2011.

* cited by examiner

RANGE FINDER DEVICE FOR MONITORING ROBOT PROCESSING TOOL POSITION

FIELD OF THE INVENTION

The invention relates to robot material processing and more particularly to a range finder device and a method for monitoring a position of a robot processing tool relative to a tracking camera mounted adjacent to the robot processing tool. The robot processing tool may in particular be a welding torch and the tracking camera may in particular be a weld joint tracking camera.

BACKGROUND

Weld joint tracking laser cameras are usually designed with a triangulation laser looking ahead at a fixed distance in front of the welding torch. These cameras are sometimes equipped with an additional 2D video color camera located in the same frontal face of the camera viewing the same area as the triangulation laser. These tracking laser cameras cannot monitor the area of the welding torch tip or monitor the position of the welding torch relative to the tracking camera and to the weld joint. Occasional collision of the welding torch with the workpiece or nearby structures may produce permanent deformation and displacement of the welding torch relative to the laser camera, breaking the initial calibration of the robot TCP (Tool Center Point). This relative displacement, if not detected and corrected, may lead to miss-tracking of the weld joint and to weld defects. Such displacement or permanent deformation still occurs even on robots equipped with anti-collision safety tool mount as described in U.S. Pat. No. 6,346,751 (Delfino et al.). U.S. Pat. No. 5,329,092 (Weaver et al.) proposes an alignment gauging block mounted in a fixed location relative to a welding robot. The block has a V-shaped notch into which the welding wire is programmed to pass on a periodic basis. Misalignment of the welding wire is detected if it contacts the sidewalls of the gauging block. The work operation of the robot must be stopped each time an alignment check is desired, and displacement of the torch tip towards the gauging block takes time and space.

SUMMARY

According to an aspect of the invention, there is provided a range finder device for monitoring a position of a robot processing tool relative to a tracking device mounted adjacent to the robot processing tool, the range finder device comprising:
a body attachable to the tracking device;
a laser unit supported by the body, the laser unit having a laser and an operative projection arrangement for projecting a triangulation laser mark on a predetermined target area of the robot processing tool;
a camera unit supported by the body, the camera unit having an image sensor and an optical viewing arrangement so that the triangulation laser mark on the target area of the robot processing tool, a tool center point of the robot processing tool and a processing area are in a field of view of the camera unit; and
a control unit connected to the laser unit and the camera unit, the control unit having:
a laser control circuit for controlling operation of the laser unit; and
an image analyzer circuit for receiving an image signal produced by the image sensor of the camera unit, producing triangulation laser measurement data from the triangulation laser mark in the image signal, generating a signal indicative of the position of the robot processing tool as function of the triangulation laser measurement data, and transmitting the image signal produced by the camera unit.

According to another aspect of the invention, there is provided a method for monitoring a position of a robot processing tool relative to a tracking device mounted adjacent to the robot processing tool, the method comprising the steps of:
attaching a range finder device to the tracking device, the range finder device comprising a laser unit having a laser and an operative projection arrangement for projecting a triangulation laser mark, a camera unit having an image sensor and an optical viewing arrangement, and a control unit connected to the laser unit and the camera unit;
positioning the laser unit so that the triangulation laser mark is projectable on a target area of the robot processing tool;
positioning the camera unit so that the triangulation laser mark, a tool center point of the robot processing tool and a processing area are in a field of view of the camera unit;
controlling operation of the laser unit so that the triangulation laser mark is projected on the predetermined target area of the robot processing tool;
receiving an image signal produced by the image sensor of the camera unit;
producing triangulation laser measurement data from the triangulation laser mark in the image signal;
generating a signal indicative of the position of the robot processing tool as function of the triangulation laser measurement data; and
transmitting the image signal produced by the camera unit whereby the position of the robot processing tool is monitored with the image signal and the signal indicative of the position of the robot processing tool.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

Figure 1:
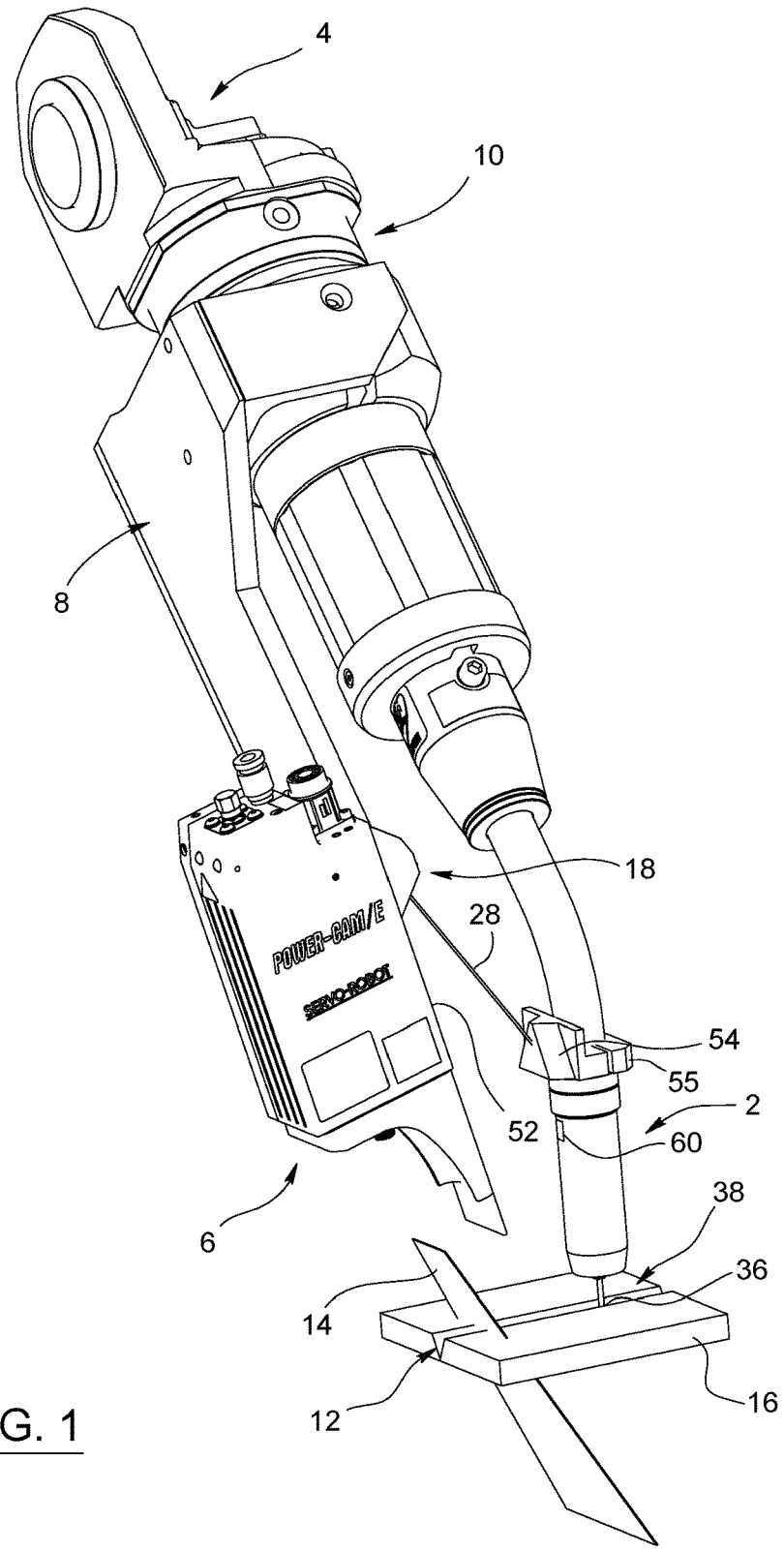
FIG. 1 is a perspective schematic view illustrating a robot welding torch and a weld joint tracking camera provided with a range finder device according to the invention.
Figure 2:
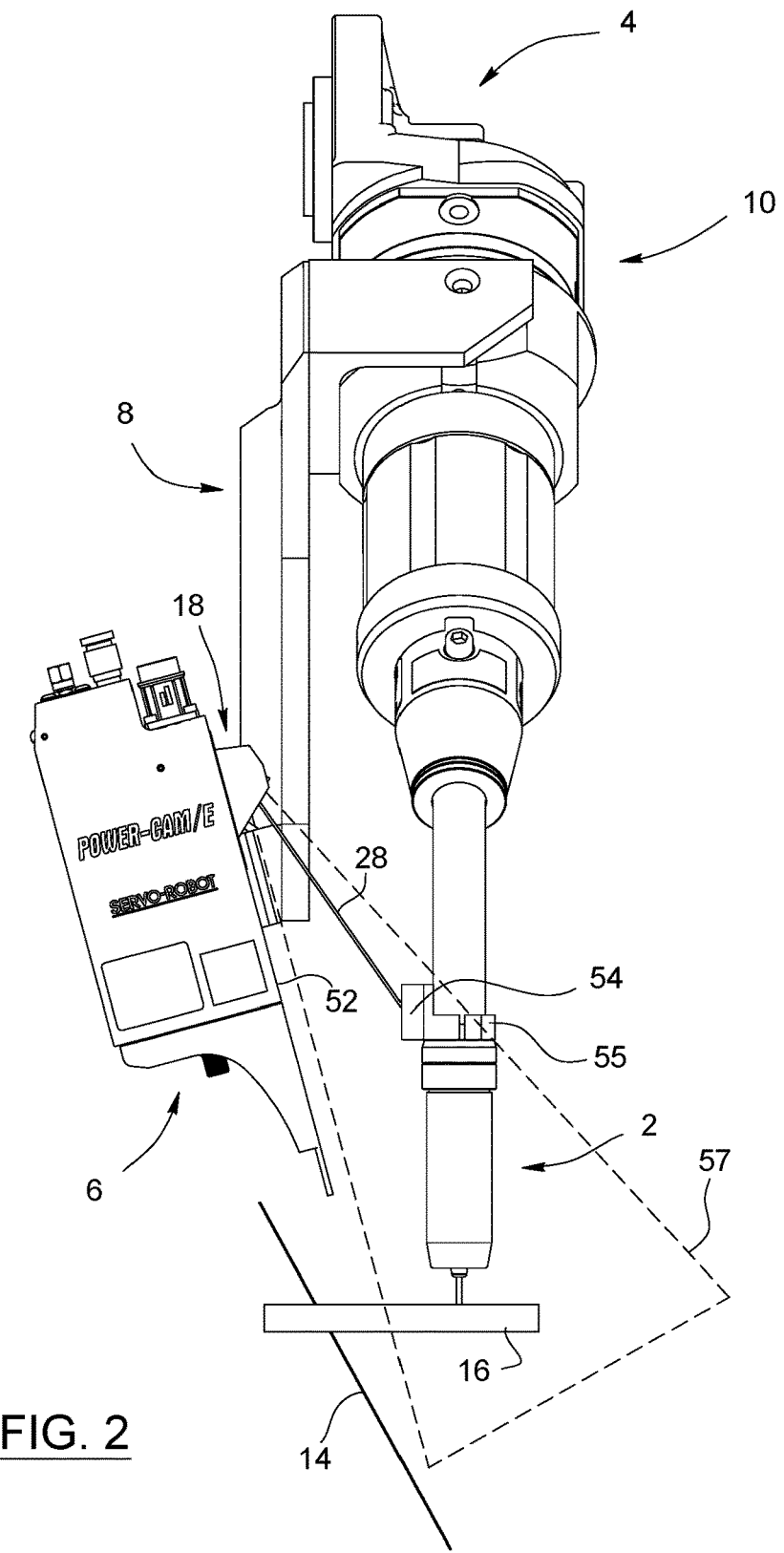
FIG. 2 is a side elevation schematic view illustrating a robot welding torch and a weld joint tracking camera provided with a range finder device according to the invention.

Referring to FIGS. 1 and 2, there is shown a typical setup of a robot welding torch 2 (e.g. a gas metal arc welding (GMAW) torch) attached to a robot wrist 4 and provided with a weld joint tracking camera 6 mounted adjacent to the robot welding torch 2, e.g. with a mounting bracket assembly 8 attached to the robot wrist 4 through mechanical coupling and jig 10. The weld joint tracking camera 6 is arranged to track a weld joint 12 (as shown in FIG. 1) at a fixed look-ahead distance in front of the robot welding torch 2, e.g. using a laser line 14 projected at an angle onto a workpiece 16 and appropriate triangulation analysis of images captured by the weld joint tracking camera 6.

While the following description of the invention is made with reference to a welding context with a robot welding torch and a weld joint tracking camera, it should be understood that other material processing contexts are also contemplated for the invention. A sealant gun, a cutting or a machining tool are examples of robot processing tools that may be used instead of a welding torch. Likewise, a tracking device that tracks an edge or another trackable element for guiding displacement of the robot processing tool may also be used instead of a weld joint tracking camera.

In accordance with an embodiment of the invention, the weld joint tracking camera 6 is provided with a range finder device 18 for monitoring a position of the robot welding torch 2 relative to the weld joint tracking camera 6.

Figure 3:
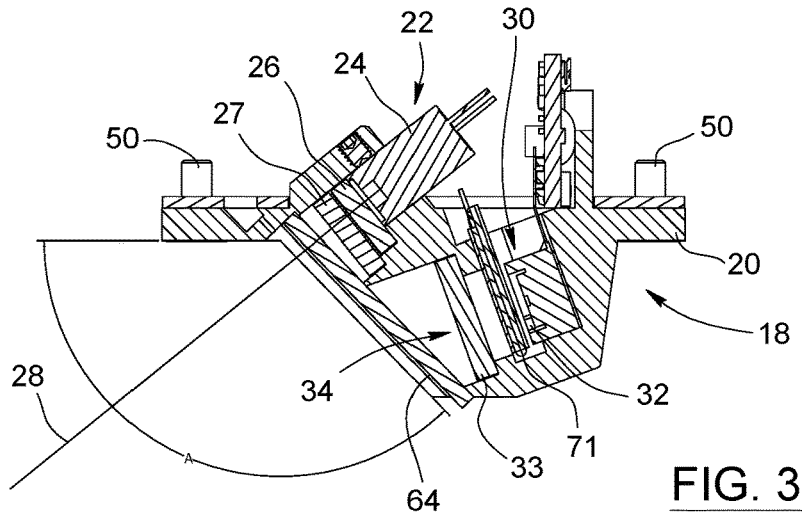
FIG. 3 is a cross section schematic view illustrating a range finder device according to the invention.

Referring to FIG. 3, the range finder device 18 has a body 20 attachable to the weld joint tracking camera 6 (as shown e.g. in FIG. 1). A laser unit 22 is supported by the body 20. The laser unit 22 has a laser 24 and an operative projection arrangement 26, such as a line lens transforming a laser dot into a laser line, for projecting a triangulation laser mark 28 on a predetermined target area of the robot welding torch 2 (as shown e.g. in FIG. 1). A camera unit 30 is supported by the body 20. The camera unit 30 has an image sensor 32 and an optical viewing arrangement 34 so that the triangulation laser mark 28 on the target area of the robot welding torch 2, a tool center point (TCP) 36 of the robot welding torch 2 and a welding area 38 (as shown in FIG. 1) are viewable by the image sensor 32.

Figure 6:
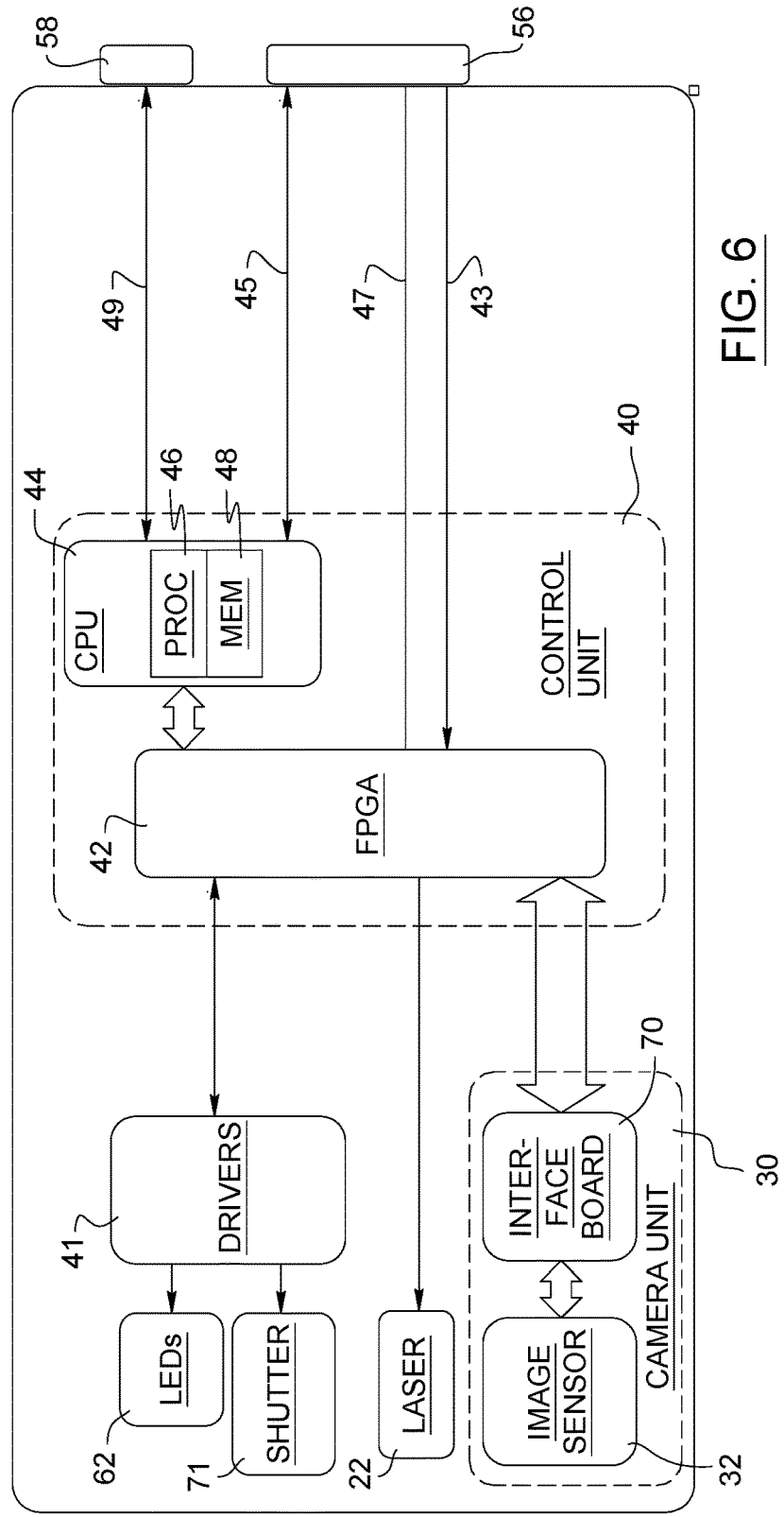
FIG. 6 is a schematic block diagram of a range finder device according to the invention.

Referring to FIG. 6, a control unit 40 is connected to the laser unit 22 and the camera unit 30. The control unit 40 has a laser control circuit/laser controller for controlling operation of the laser unit 22. The control unit 40 also has an image analyzer circuit/image analyzer for receiving an image signal produced by the image sensor 32 of the camera unit 30, producing triangulation laser measurement data from the triangulation laser mark 28 in the image signal as shown e.g. in FIG. 7, generating a signal indicative of the position of the robot welding torch 2 (as shown e.g. in FIG. 1) as function of the triangulation laser measurement data, and transmitting the image signal produced by the camera unit 30 through e.g. a video connector 58. The laser control circuit/laser controller and the image analyzer circuit/image analyzer may be embodied by a field-programmable gate array (FPGA) 42 connected to a processing unit (CPU) 44 having a processor 46 and a memory 48 (or multiple processors and memory modules if desired) as such components are highly configurable and can be used to perform various functions. However, it should be understood that the laser control circuit/controller and image analyzer circuit/ analyzer may be implemented differently if desired, for example using a microcontroller or a circuit made of discrete electric and electronic components.

Figure 4:
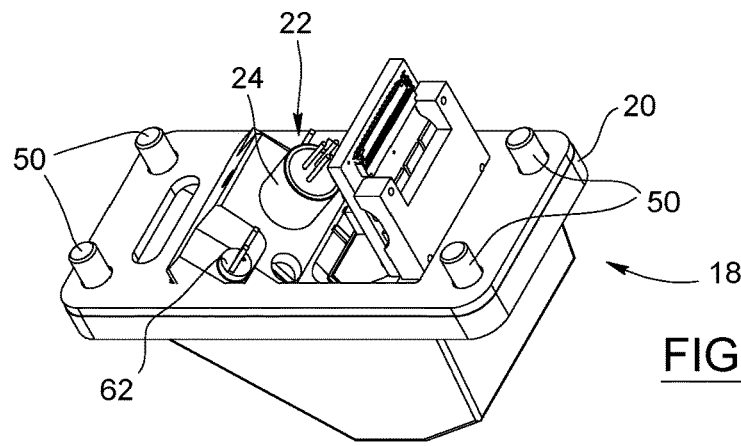
FIG. 4 is a perspective schematic view illustrating a range finder device according to the invention.
Figure 5:
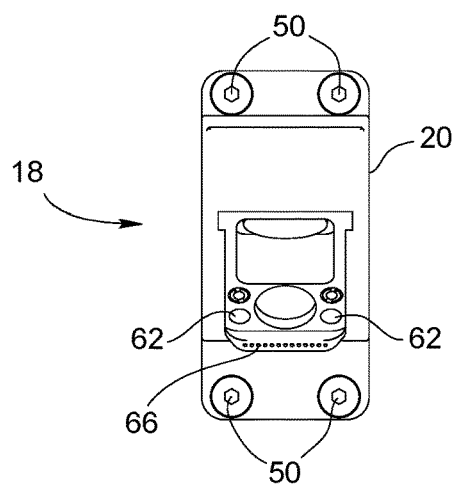
FIG. 5 is a front schematic view of a range finder device according to the invention.

Referring to FIGS. 3, 4 and 5, the body 20 preferably has a mounting assembly such as pins and bolts 50 for mounting the body 20 on a side 52 of the weld joint tracking camera 6 facing the robot welding torch 2 (as shown in FIGS. 1 and 2). The mounting assembly is such that a tilt angle of the body 20 is adjusted to a tilt angle of the tracking camera 6 with respect to the welding torch 2 so that the laser unit 22 and the camera unit 30 are directed and positioned to fit the torch angle and the look-ahead distance (LAD) when the range finder device 18 is mounted on the tracking camera 6. This may be achieved by providing the body 20 with a mounting surface on the side of the tracking camera 6 that has an appropriate mounting angle for this purpose, or by providing the tracking camera 6 with an accommodating surface for the range finder device 18. The mounting assembly may be adjustable to adapt the angle of the range finder device 18 with respect to the tracking camera 6 as desired. The mounting assembly should preferably be airtight to prevent entry of possible fumes.

Referring again to FIGS. 1 and 2, the target area of the robot welding torch 2 preferably has a target element 54 extending on a front side of the robot welding torch 2 facing the weld joint tracking camera 6. The target element 54 may be a mark (not shown in the Figures) engraved on the front side of the robot welding torch 2 or a block attached to the robot welding torch 2 by an appropriate bracket arrangement 55 and having a shape which preferably is well adapted for triangulation measurements. The shape may advantageously correspond to a triangular shape projecting from the robot welding torch 2 towards the weld joint tracking camera 6 as shown in FIGS. 1 and 2. Such a target element improves the precision of the triangulation, for example better than 0.2 mm for the XYZ position of the torch body. The block may advantageously be made of hard anodized aluminum, brass or other materials highly resistant to spatters.

Referring back to FIG. 6, the memory 48 may be used by the image analyzer circuit for storing reference position data of the robot welding torch 2 (as shown e.g. in FIG. 1). The processor 46 connected to the memory 48 may be configured for comparing the signal indicative of the position of the robot welding torch 2 with the reference position data and generating a warning signal when a difference detected between the signal indicative of the position of the robot welding torch 2 and the reference position data exceeds a preset displacement threshold. The detected position difference and warning data with a time stamp may be stored in the memory 48 if desired. The warning signal may be externally transmitted through a connector 56. Alternately or additionally, the warning signal may take the form of an audible sound output by a speaker (not shown) or a visible signal output by a light indicator (not shown). The processor 46 may be configured to store an image from the image signal produced by the image sensor 32 of the camera unit 30 in the memory 48 when the warning signal is generated. The image may be externally transmitted through the video output connector 58 e.g. at an end of a coaxial line 49, for viewing by an operator e.g. on a tablet or display screen (not shown). The control unit 40 may be provided with a wireless communication module (not shown) for communicating with external devices (not shown) if desired, such as M2M IoT (Machine to Machine Internet of Thing). The connector 56 may be used to communicate with the control unit 40, e.g. through a control line 43 and an Ethernet line 45, and to provide power supply e.g. through supply line 47.

The memory 48 may be used to store welding torch identification data and corresponding welding torch configuration data. The processor 46 may be then configured to have a function for detecting an identification of the robot welding torch 2 (as shown in FIG. 1) from an identification mark detected in the image signal produced by the image sensor 32 of the camera unit 30, e.g. a barcode, and retrieving the corresponding welding torch configuration data from the memory 48 to be used for producing the triangulation laser measurement data. The identification mark in the image signal may for example result from an ID label 60 affixed to the robot welding torch 2 as shown in FIG. 1. Optionally, both the robot welding torch 2 and the range finder device 18 may be equipped with IoT communication.

The triangulation laser mark 28 (as shown e.g. in FIG. 1) projected by the laser unit 22 may consist of parallel or cross lines to improve the triangulation precision.

The camera unit 30 may have a sensor interface board 70 for preprocessing the image signal. The camera unit 30 preferably has an autofocus and an adjustable region of interest controllable by the control unit 40. The camera unit is preferably provided with a shutter 71 extending in front of the image sensor 32 as shown in FIG. 3, operable by the control unit 40. The shutter 71 may advantageously be a LCD shutter, activated during welding to cut the intense radiation from the welding electric arc coming onto the image sensor 32.

The processor 46 is preferably configured to compute a position of the TCP by image analysis of the image signal received from the camera unit 30. Such a TCP position may be used to define an origin of the coordinate system.

Figure 7:
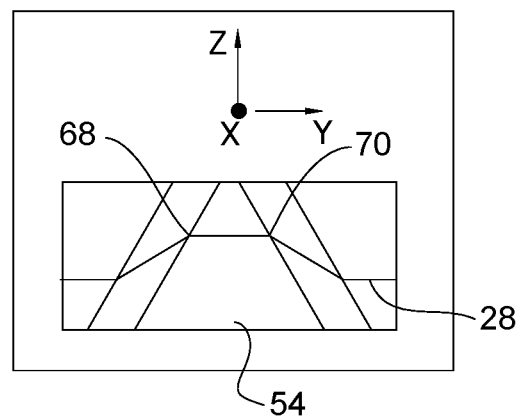
FIG. 7 is a schematic diagram illustrating an image of a target block with a triangulation laser mark according to the invention.
Figure 8:
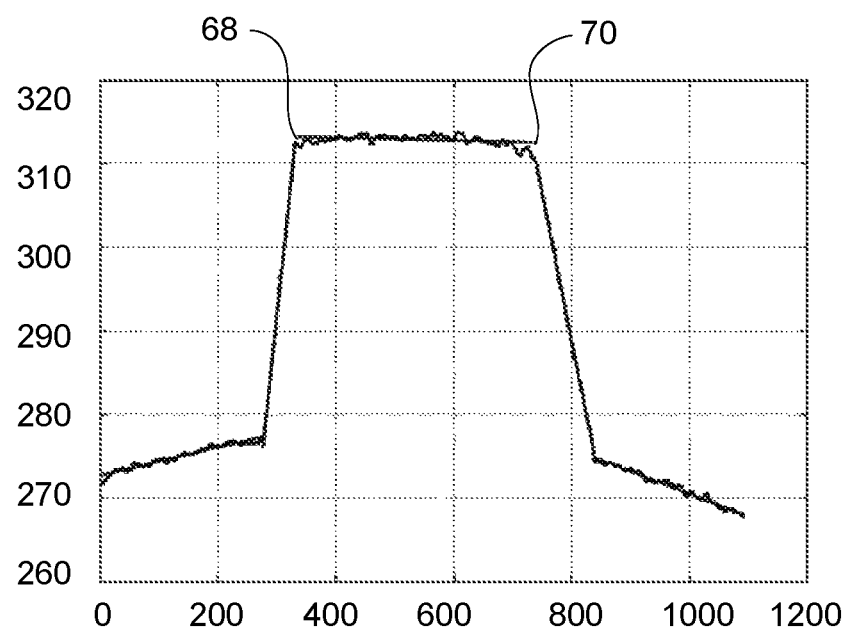
FIG. 8 is a graph illustrating triangulation laser measurement data according to the invention.

Referring to FIGS. 7 and 8, the image analyzer circuit may be configured to detect intensity peaks in the image signal and two breakpoints 68, 70 in the segmented laser mark 28 resulting from projection of the triangulation laser mark 28 on the target area of the robot welding torch 2 (as shown e.g. in FIG. 1). The position of the robot welding torch 2 can be determined as function of a distance between the two breakpoints 68, 70 with adjustment of polynomial calibration parameters. FIG. 8 shows an example of a profile viewed by the camera unit 30.

Referring to FIGS. 4 and 5, the range finder device 18 may preferably further have LEDs 62 supported by the body 20 and directed to light a scene viewed by the image sensor 32 (as shown in FIG. 3).

Referring back to FIG. 3, the range finder device 18 preferably has a protection window 64 extending in front of the laser unit 22 and the camera unit 30, and an air jet arrangement 66 as shown in FIG. 5, extending on an external side of the protection window 64. The protection window 64 isolates fixed protection lens 27, 33 of the laser unit 22 and of the camera unit 30. As a result, all the optical apertures of the range finder device 18 are cooled and protected against contaminating substance and fumes by the optically transparent window 64 designed with integrated air jets 66 all around the aperture areas.

Figure 9:
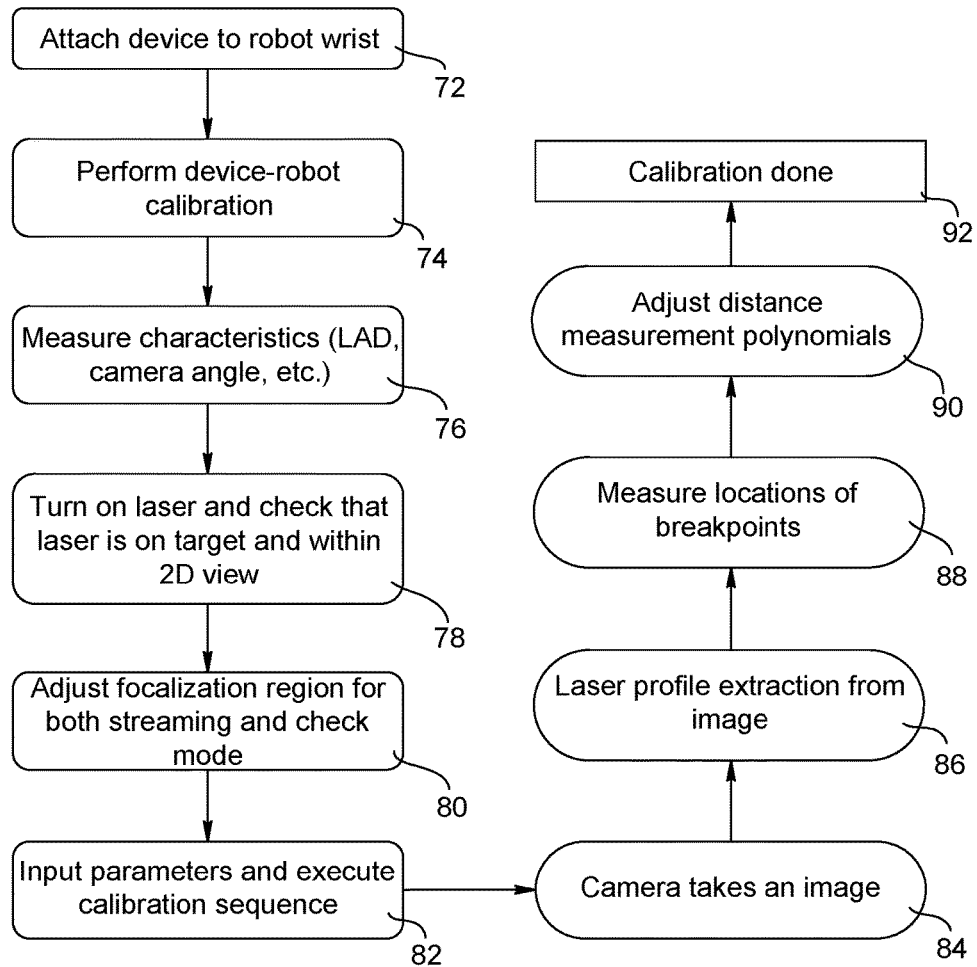
FIG. 9 is a flowchart illustrating a calibration sequence of a range finder device according to the invention.

Referring to FIG. 9, there is shown a possible automatic self-calibration sequence for the range finder device 18 (as shown e.g. in FIG. 1). Initially, the range finder device 18 is attached to the weld joint tracking camera 6 as depicted by block 72, either as an integral part or as a separate part of the weld joint tracking camera 6. The laser unit 22 should be positioned so that the triangulation laser mark 28 is projectable on the target area of the robot welding torch 2. The camera unit 30 should be positioned so that the triangulation laser mark 28, the tool center point 36 of the robot welding torch 2 and the welding area 38 are viewable by the image sensor 32. Calibration is then initiated as depicted by block 74. Characteristics and parameters of the setup are ascertained, to determine/check the look-ahead distance (LAD) of the weld joint tracking camera 6, its angle, etc. as depicted by block 76. Operation of the laser unit 22 is controlled so that the triangulation laser mark 28 is projected on the target area of the robot welding torch 2 and the field of view of the camera unit 30 covers at least the target area as depicted by block 78 for carrying out the calibration. In an embodiment, the field of view of the camera unit 30 has a pyramidal shape 57 as shown in dashed lines in FIG. 1, flaring from the camera unit 30 (although shown in 2D, it should be understood that the pyramidal shape has a 3D volume). A focalization region of the camera unit 30 is adjusted for both streaming and check mode as depicted by block 80. The parameters of the setup, e.g. the camera angle with the torch axis, the look-ahead distance of the tracking laser line, the tolerances of the torch target position, the region of interest of the image sensor 32 for the torch target position monitoring and also for the weld joint monitoring during or between welding sequences, are entered for example by an operator through a tablet or PC (not shown) connected to the control unit 40 of the range finder device 18, and a calibration sequence is started as depicted by block 82. The parameters entry may be automated by the camera unit 30 reading the torch identification 60 on the torch body and the parameters data may be retrieved from a database in the memory 48 of the control unit 40. The calibration sequence may begin by turning on the LEDs 62 and the laser 22 and acquiring an image of the laser line 28 on the target 54 with the camera unit 30 as depicted by block 84. A vision algorithm programmed in the control unit 40 then determines a position of the laser line 28 for example through the intensity peaks and the two breakpoints 68, 70 of the segmented laser line 28 as depicted by block 86. A distance between the breakpoints 68, 70 depends on the location of the laser line 28 on the target. The control unit 40 determines the location on the 2D image of the target, its apparent size and the location of the laser line 28 on the target. From the real dimensions of the target, the distance measured on the target laser line 28 between the two breakpoints 68, 70, as depicted by block 88, is calibrated with adjustment of polynomial calibration parameters as depicted by block 90. The normal XYZ position of the robot welding torch 2 is thus determined with the position of the two breakpoints 68, 70, in the reference frame of the robot welding torch 2, and the calibration is done as depicted by block 92. As shown in FIG. 7, a vertical position of the breakpoints 68, 70 provides a displacement measurement along the X axis, a horizontal position of the breakpoints 68, 70 provides a displacement measurement along the Y axis, while a distance between the breakpoints 68, 70 provides a displacement measurement along the Z axis. The variance of the position is also computed and stored in the memory 48. The control unit 40 may be configured to follow a calibration check routine defining when a calibration check should be carried out. In another embodiment, the torch position can be measured by a cross line laser finding the Y center of the torch body and the XZ position on a cross line engraved on the torch body surface.

Figure 10:
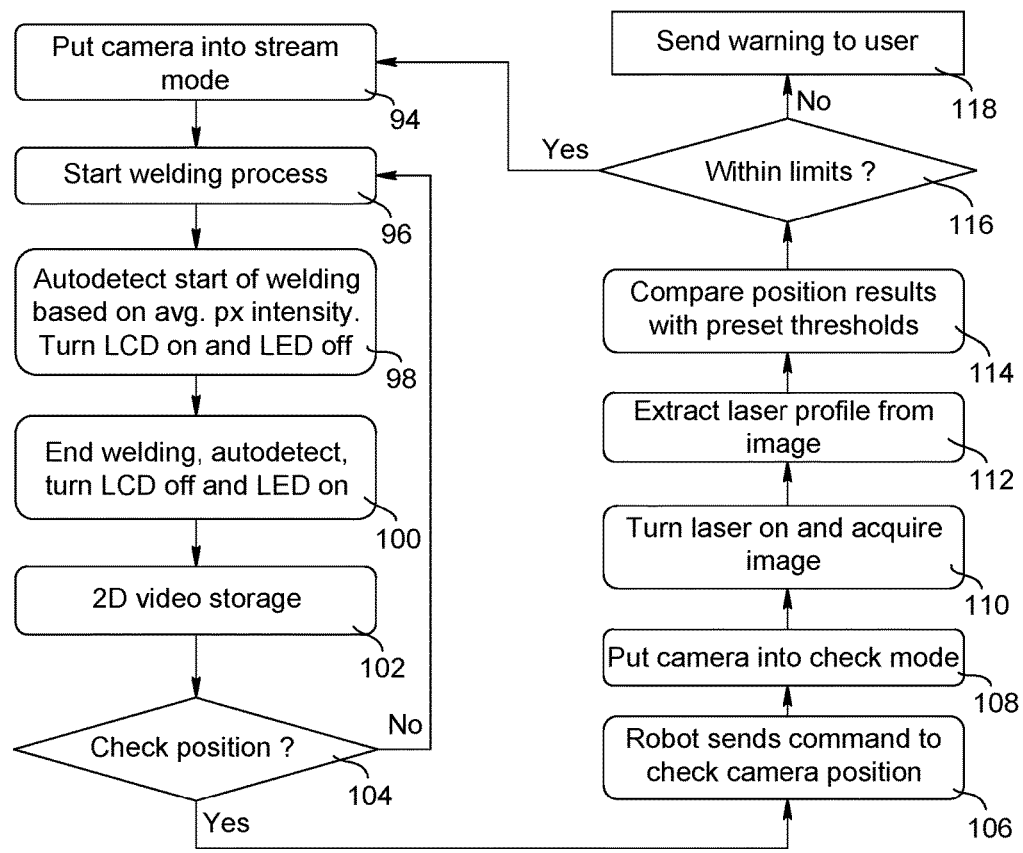
FIG. 10 is a flowchart illustrating an operation mode of the range finder device according to the invention.

Referring to FIG. 10, there is shown a possible normal operation process of the range finder device 18. Before a welding sequence, the camera unit 30 is put in streaming mode as depicted by block 94. A real-time video may be transmitted to the operator display (not shown) e.g. through the connector 58 (as shown in FIG. 6). The control unit 40 computes an average pixel intensity of the picture. When it exceeds a preset threshold, the LCD shutter 71 is activated and a welding start is detected. This may correspond to a start of the welding process as depicted by block 96, an autodetection step as depicted by block 98 where the LCD shutter 71 is turned on and the LEDs 62 are turned off, and another autodetection step as depicted by block 100 to detect a welding stop based on the average pixel intensity of the picture captured by the camera unit 30, in which case the LCD shutter 71 is turned off and the LEDs 62 are turned on. The memory 48 may be used for 2D video storage as depicted by block 102. The control unit 40 waits for a position check request as depicted by block 104, for example given by the robot or the operator as depicted by block 106. When such a request is received, the camera unit 30 stops the streaming and switches into torch position check mode as depicted by block 108. The control unit 40 changes the focalization parameters of the image sensor 32, lights on the laser 22 and acquires a 2D image as depicted by block 110. The control unit 30 then computes the torch XYZ position as in the calibration sequence described above, and stores its value in a log file as depicted by block 112. The control unit 30 compares the last measured position with the initial position as depicted by block 114. If the difference between the positions is within preset limits, as depicted by block 116, then the welding task may continue. If not, then a warning signal is generated as depicted by block 118 to warn the operator, and the welding task may be stopped by the operator. A command may be sent by the control unit 40 or optionally by the operator to verify the target calibration. If a torch misalignment is detected, a corrective action is asked for. If not, the camera unit 30 returns to streaming mode, ready for welding. In another embodiment, the torch position can be measured between welding sequences with the image sensor 32 in the check mode only.

Referring again to FIG. 1, the range finder device 18 thus allows on-line monitoring of the relative welding torch position, and allows detecting any accidental displacement of the robot welding torch 2 relative to the weld joint tracking camera 6 which may be caused by a collision with the workpiece 16 or another component. The backside positioning of the range finder device 18 allows a better viewing of the TCP—weld pool area and may provide information on torch identification, arc time tracking, timer functions and welding-process assistance towards complete automation of mechanized or robotized welding process from part and joint location through joint tracking and weld complete execution. The range finder device 18 may be attached to other locations or sides of the tracking camera 6 if desired. The range finder device 18 may be used to monitor the portion of other robotic tools requiring precise positioning such as sealant gun, cutting or machining tool, etc. The range finder device 18 allows for less rigid mount of the robot welding torch 2 on the robot arm 4 to prevent torch or robot from being damaged from collisions. The front face of the camera 6 may be made smaller and cause less obstruction to the welding torch 2. The control unit 40 (as shown in FIG. 6) may, depending on the model of the camera 6, be implemented in the control unit of the camera 6. Preferably, the range finder device 18 is located on an upper portion of the camera 6 so as to be farther from the welding area and be less exposed to welding spatters, heat and fumes. The range finder device 18 may be attached to the camera 6 through the mounting bracket assembly 8 if desired. Accurate relative XYZ torch position can be measured with the help of the target block 54 attached to the robot welding torch 2 or a reference mark on the torch body. The torch position can be monitored either during welding or between welding sequences. When a displacement is detected to be larger than a preset threshold, a warning signal may be displayed, recorded and sent to the welding operator. The design of the triangular target block 54 fits many types of welding torches and also yields high XYZ resolution. In another embodiment, a double line triangulation laser unit 22 may be used to measure directly the cylindrical torch body position with the help of a simple cross line carved on the torch body.

An operator can at all time remotely watch on a video monitor (not shown) the field of view of the 2D cameras 6, 30 for process management and verify that the tracking point found by the tracking laser is as requested as seen by the position of the welding torch tip and welding wire tip on the joint. The operator can also monitor during welding the arc light, the fumes and spatters around the torch tip. After a warning signal, the operator can look at the 2D image taken when a torch displacement was detected, look at the region of interest of this image, the triangulation profiles acquired by the camera unit 30, the torch position at this time and its time evolution before. A large deviation of the cylindrical torch tip center from the weld joint can also be detected directly on the 2D image without laser triangulation.

In an embodiment, the tracking camera 6 is designed to accommodate the range finder device 18 e.g. with a backside (or other side) mounting arrangement provided with threaded holes for the bolts 50 (as shown e.g. in FIG. 5) and integrated interface connections so that the built-in control unit of the camera 6 may be shared with the range finder device 18 for its operation.

Referring again to FIG. 6, the control unit 40 may be configured with various modes of operation, for example so that the image sensor 32 takes continuous pictures of the target 54 (as shown e.g. in FIG. 1) with the laser line on it and of the visible scene of the weld joint in front of the welding torch 2. The vision algorithm may be implemented in the CPU 44 or the FPGA 42. The CPU 44 may be used to execute code for user calibration (procedure, graphical interface, input of the parameters, beta angle of the camera 6, LAD, etc.), providing a GUI so that the user may define the region of interest (ROI) for the focalization (i.e. an area for measurement of the target 54 and another area for the monitoring), providing an interface to view the results, streamer/saving videos, input of the tolerances, management of the response if a movement has occurred, performing analysis and automatically activating the LCD shutter 71. Generic calibration polynomials may be hard coded in the control unit 40. A picture acquired by the camera unit 30 may be used to calculate inter-pixel distances (the target 54 has a predefined width/height) and the generic polynomials can be changed as function of the inter-pixel distances.

The image sensor 32 may advantageously be a CMOS color sensor for the triangulation measurement of the torch position and for the color video of the welding area, the board 70 being then a CMOS interface board. Optical filters may be implemented through the LCD shutter 71 to allow the triangulation measurement and 2D color video of the welding area with and without welding.

The LEDs 62 and the LCD shutter 71 may be operated by drivers 41 connected to the FPGA 42 of the control unit 40.

While embodiments of the invention have been illustrated in the accompanying drawings and described above, it will be evident to those skilled in the art that modifications may be made therein without departing from the invention.

The invention claimed is:

1. A range finder device for monitoring a position of a robot processing tool relative to a tracking device mounted adjacent to the robot processing tool, the range finder device comprising:
    a body attachable to the tracking device;
    a laser unit supported by the body, the laser unit having a laser and an operative projection arrangement for projecting a triangulation laser mark on a predetermined target are of the robot processing tool;
    a camera unit supported by the body, the camera unit having an image sensor and an optical viewing arrangement so that the triangulation laser mark on the target area of the robot processing tool, a tool center point of the robot processing tool and a processing area are in a field of view of the camera unit; and
    a control unit connected to the laser unit and the camera unit, the control unit having:
        a laser controller, configured for controlling operation of the laser unit; and
        an image analyzer, configured for receiving an image signal produced by the image sensor of the camera unit, producing triangulation laser measurement data from the triangulation laser mark in the image signal, generating a signal indicative of the position of the robot processing tool as function of the triangulation laser measurement data, and transmitting the image signal produced by the camera unit.

2. The range finder device according to claim 1, wherein the body has a mounting assembly for mounting the body on a side of the tracking device facing the robot processing tool, at a tilt angle adjusted to a tilt angle of the tracking device with respect to the robot processing tool.

3. The range finder device according to claim 1, wherein the target area comprises a target element extending on a front side of the robot processing tool facing the tracking device.

4. The range finder device according to claim 3, wherein the target element comprises a mark engraved on the front side of the robot processing tool or block attached to the robot processing tool and having a predetermined shape.

5. The range finder devise according to claim 4, wherein the shape corresponds to a triangular shape projecting from the robot processing tool awards the tracking device.

6. The range finder device according to claim 1, wherein the image analyzer includes a memory for storing reference position data of the robot processing tool, and a processor connected to the memory for comparing the signal indicative of the position of the robot processing tool with the reference position data and generating a warning signal when a difference detected between the signal indicative of the position of the robot processing tool and the reference position data exceeds a preset displacement threshold.

7. the range finder device according to claim 6, wherein the processor is configured to store an image from the image signal produced by the image sensor of the camera unit into the memory when the warning signal is generated.

8. The range finder device according to claim 6, wherein the memory stores processing tool identification data and corresponding processing tool configuration data, and the processor has a function for detecting an identification of the robot processing tool from an identification mark detected in the image signal produced by the image sensor of the camera unit, and retrieving the corresponding processing tool configuration data from the memory to be used for producing the triangulation laser measurement data.

9. The range finder device according to claim 1, further comprising LEDs supported by the body and directed to light a scene viewed by the image sensor.

10. The range finder device according to claim 1, further comprising a protection window extending in front of the laser unit and the camera unit, and an air jet arrangement extending on an external side of the protection window.

11. The range finder device according to claim 1, wherein the camera unit has a sensor interface board for preprocessing the image signal.

12. The range finder device according to claim 11, wherein the camera unit has an autofocus and an adjustable region of interest controlled by the control unit.

13. The range finder device according to claim 1, wherein the camera unit is provided with a shutter extending in front of the image sensor, operable by the control unit.

14. The range finder device according to claim 6, wherein the processor is configured to compute a position of the tool center point by image analysis of the image signal received from the camera unit.

15. The range finder device according to claim 1, wherein the image analyzer circuit is configured to detect intensity peaks in the image signal and two breakpoints in a segmented laser mark resulting from projection of the triangulation laser mark on the predetermined target area of the robot processing tool, the position of the robot processing tool being determined as function of positions of and a distance between the two breakpoints with adjustment of polynomial calibration parameters.

16. The range finder device according to claim 1, wherein the robot processing tool comprises a welding torch and the tracking device comprises a weld joint tracking camera.

17. A method for monitoring a position of a robot processing tool relative to a tracking device mounted adjacent to the robot processing tool, the method comprising the steps of:
    attaching a range finder device to the tracking device, the range finder device comprising a laser unit having a laser and an operative projection arrangement for projecting a triangulation laser mark, a camera unit having an image sensor and an optical viewing arrangement, and a control unit connected to the laser unit and the camera unit;
    positioning the laser unit so that the triangulation laser mark is projectable on a target area of the robot processing tool;
    positioning the camera unit so that the triangulation laser mark, a tool center point of the robot processing tool and a processing area are in a field of view of the camera unit;
    controlling operation of the laser unit so that the triangulation laser mark is projected on the predetermined target area of the robot processing tool;
    receiving an image signal produced by the image sensor of the camera unit;
    producing triangulation laser measurement data from the triangulation laser mark in the image signal;
    generating a signal indicative of the position of the robot processing tool as function of the triangulation laser measurement data; and
    transmitting the image signal produced by the camera unit whereby the position of the robot processing tool is monitored with the image signal and the signal indicative of the position of the robot processing tool.

18. The method according to claim 17, further comprising the steps of, with the control unit:

initially storing reference position data of the robot processing tool as function of an initial signal indicative of the position of the robot processing tool;

comparing the signal indicative of the position of the robot processing tool with the reference position data during or between processing sequences; and generating a warning signal when a difference detected between the signal indicative of the position of the robot processing tool and the reference position data exceeds a preset displacement threshold.

\* \* \* \* \*